United States Patent [19]
von Holdt

[11] Patent Number: 5,780,077
[45] Date of Patent: Jul. 14, 1998

[54] ADJUSTABLE MOLD GATE FOR A HOT PROBE MEMBER

[75] Inventor: John W. von Holdt, 6864 Lexington La., Niles, Ill. 60648

[73] Assignee: John W. Von Holdt, Niles, Ill.

[21] Appl. No.: 523,381

[22] Filed: Sep. 5, 1995

[51] Int. Cl.[6] .................................................. B29C 45/23
[52] U.S. Cl. ..................... 425/564; 264/328.9; 425/566
[58] Field of Search ............................ 425/549, 564, 425/566; 264/328.9

[56] References Cited

U.S. PATENT DOCUMENTS

| | | | |
|---|---|---|---|
| 4,687,613 | 8/1987 | Tsutsumi | 425/549 |
| 4,781,572 | 11/1988 | Boring . | |
| 5,030,613 | 7/1991 | Orimoto et al. | 425/564 |
| 5,078,589 | 1/1992 | Osuna-Diaz . | |
| 5,141,155 | 8/1992 | Jacobsen . | |
| 5,141,696 | 8/1992 | Osuna-Diaz . | |
| 5,231,378 | 7/1993 | Gellert . | |
| 5,501,594 | 3/1996 | Glozer | 425/566 |

OTHER PUBLICATIONS

Osco's Exclusive Adjustable Mold Flow System by Osco Inc. 24 pages—Brochure.
Brochure relating to the "Dan-Tip Hot Runner System" dated Aug., 1993 at the latest—6 pages.

Primary Examiner—Tim Heitbrink
Attorney, Agent, or Firm—Banner & Witcoff Ltd.

[57] ABSTRACT

Method and apparatus for adjusting either the flow area to a constant size mold gate or the area of a variable mold gate opening in order to control the flow of molten plastic to a mold cavity for the injection molding of plastic parts, such adjustment being made by rotating an outer rotary gate bushing relative to an inner stationary hot sprue bushing which is surrounded by said outer rotary gate bushing.

19 Claims, 9 Drawing Sheets

ADJUSTABLE MOLD GATE FOR A HOT PROBE MEMBER

BACKGROUND OF THE INVENTION

The present invention relates to mold gates for controlling the flow of molten plastic into a cavity of a mold for injection molding of plastic parts, as for example, plastic buckets. In typical commercial operations, multiple molding chambers are provided so that several molded products can be produced in a single molding cycle. Normally, each such molding chamber will have its own mold gate to control the flow of molding compound into a molding cavity or chamber.

One object of the present invention is to provide improved mechanism for adjusting a mold gate in order to increase or reduce the flow rate of the molten plastic into the mold cavity. In accordance with one embodiment of the invention, such adjustment is achieved manually by use of a hand tool when the mold is open at the parting line. Such an adjustment feature is desirable where a very large number of cavities and mold gates are utilized, for example, with a mold having 48 cavities and corresponding gates.

Another embodiment of the present invention permits adjustment of a mold gate from outside the mold so that such adjustments can be made without opening the mold. In accordance with one design, such outside gate adjustment mechanism is used when 16 mold cavities and gates are utilized.

Each of the foregoing embodiments of the invention offers significant advantages over known molds which must be disassembled in order to adjust the opening of a mold gate.

Prior art mold gates customarily have mechanism for opening or closing down the size of a flow area to a central hole which leads to a mold cavity. However, while adjustment of the flow area leading to a round opening communicating with the mold cavity may serve to regulate such flow, the final circular opening is fixed in size so that such regulation is limited.

Another significant objective of the present invention is to provide an adjustable mold gate which will adjust the size of the final opening through which molten plastic flows into the mold cavity so that the opening is not a constant as in prior designs.

Another objective of the present invention is to provide a mold gate which can be adjusted so that by the time the molten plastic in the mold cavity has hardened an amount sufficient to eject the part, the plastic in the area of the mold gate will also be sufficiently hardened so that the length of a mold cycle need not be extended in order to await hardening of the plastic in the mold gate area.

In particular, one embodiment of the present invention provides a mold gate opening which comprises an annular passage defined by an outer diameter and an inner diameter, between which the annular passage is defined for the flow of molten plastic. For a given area of gate opening, such an annular passage will permit molten plastic to cool more rapidly than where the mold opening comprises a round hole because in the latter case the resulting round piece of plastic which must harden in the gate area before the next cycle can begin will not cool rapidly in the middle of such a piece. In contrast, an annular ring of plastic in the mold gate area will cool more rapidly so as to avoid the need to extend the mold cycle simply to permit cooling of the plastic in the gate area.

Another important object of the present invention is to provide a nozzle insert with a plastic runner extending therethrough, the insert having radially expandable end portions so that under high pressure from the molten plastic the insert will expand radially against other mold elements to effect improved sealing against leakage of the molding compound.

The foregoing and other objects and advantages of the invention will be apparent from the following description of certain preferred embodiments thereof, taken in conjunction with the accompanying drawings.

Now, in order to acquaint those skilled in the art with the manner of making and using my invention, I shall describe, in conjunction with the accompanying drawings, certain preferred embodiments of the invention.

DETAILED DESCRIPTION OF THE INVENTION

Figure 1:
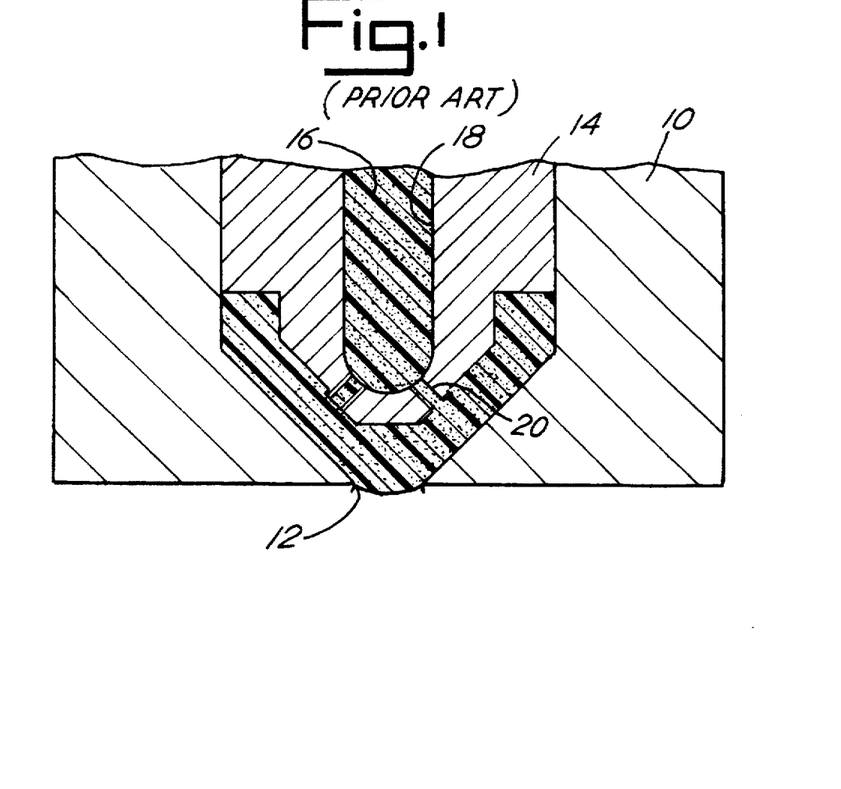
FIG. 1 is a fragmentary vertical section showing a known mold gate in an open position.
Figure 2:
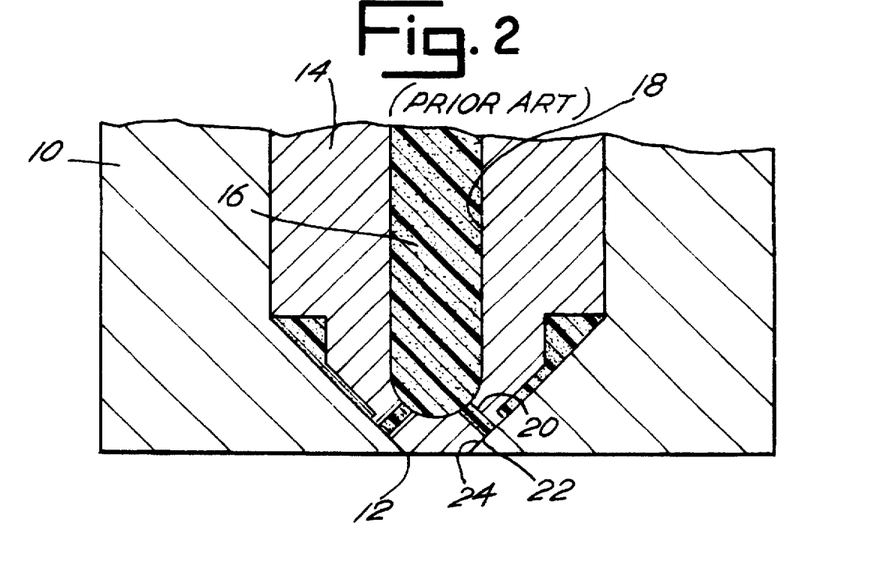
FIG. 2 is similar to FIG. 1 and shows the mold gate in a closed position.

FIGS. 1 and 2 show a prior art mold gate including a stationary mold element 10 having at its lower end a fixed diameter central hole 12 which leads to a mold cavity (not shown). A vertically movable hot probe member 14 is shown in its raised, fully open position so that molten plastic 16 can flow through a central passage 18 in the probe member 14 and through openings 20 at the lower end thereof into a flow area leading to the final, fixed diameter opening 12 which communicates with a mold cavity.

FIG. 2 shows the probe member 14 in its lowered, fully closed position where molten plastic is prevented from flowing through central opening 12 to a mold cavity.

One disadvantage of the foregoing known gate structure is that when the probe 14 is in its lowered, fully closed position, the probe conical surface 22 bears against the sloping conical surface 24 of the mold element 10 which surrounds the central hole 12, thereby putting pressure on the conical surface 24 which can cause chipping of the latter.

In addition, while vertical movement of the hot probe 14 will effect adjustment of the flow area leading to the final opening 12, the size of the latter opening is constant and cannot be adjusted.

Figures 3, 4, 5, 6, 7:
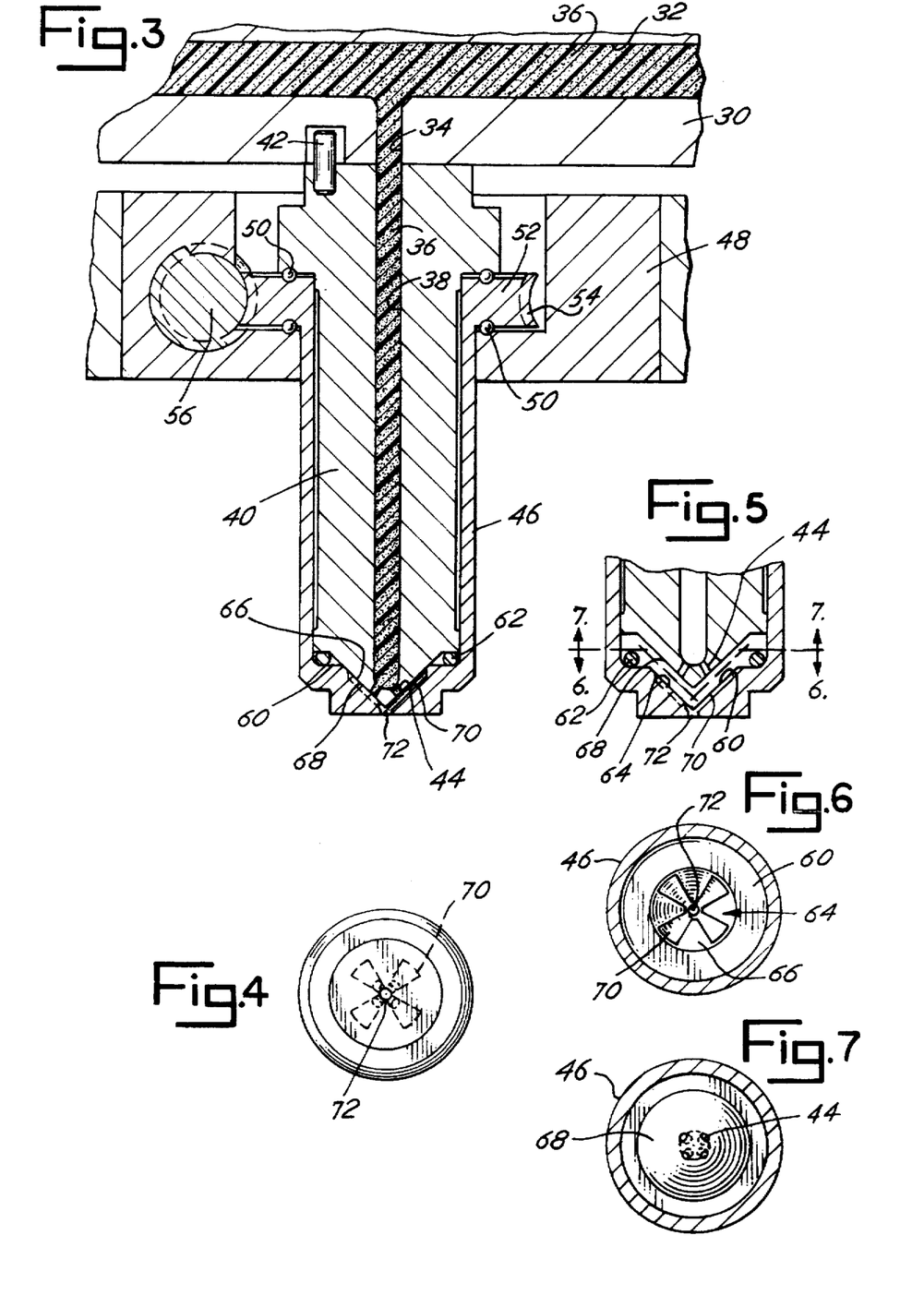
FIG. 3 is a fragmentary vertical section showing a first embodiment of the present invention including a constant size gate and mechanism to adjust the flow rate to the gate including a stationary internal member and a rotatable outer member, the gate being adjustable from outside the mold through rotation of the outer member.
FIG. 4 is a bottom view of the gate assembly of FIG. 3.
FIG. 5 is a fragmentary vertical section showing the lower end of the gate assembly of FIG. 4.
FIG. 6 is a view taken along line 6—6 of FIG. 5 looking down at the lower end of the rotatable outer member.
FIG. 7 is a view taken along line 7—7 of FIG. 5 looking up at the lower end of the stationary internal member

Reference is now made to FIGS. 3–7 which illustrate the first embodiment of the present invention. FIG. 3 shows a hot manifold 30 having passages 32 and 34 through which molten plastic 36 flows on its way to a mold cavity (not shown) for injection molding of plastic parts. The molten plastic 36 flows down through a central opening 38 in a hot sprue bushing 40 which is a stationary mold component. The hot sprue bushing 40 is keyed to the fixed hot manifold 30 by a key or pin such as shown at 42. Heater elements (not shown) may be incorporated into the hot sprue bushing 40 if desired to assist in maintaining the plastic material in a molten state.

The lower end of the hot sprue bushing 40 is generally conical in shape and has four spaced round holes 44 best shown in FIGS. 5 and 7. Molten plastic 36 flowing down through the hot sprue bushing 40 flows through the holes 44 and ultimately to a mold cavity when a mold gate member is in its open position.

A rotary gate bushing 46 is a tubular like member which surrounds the hot sprue bushing 40 and is rotatable about the stationary bushing 40. The purpose of rotating the rotary gate bushing 46 is to open and close the gate as will be described. The rotary gate bushing is mounted between a fixed mold member 48 and the hot sprue bushing 40 by a plurality of ball bearings 50 which cooperate with a flange 52 at the upper end of the rotary gate bushing 46.

The outer periphery of the flange 52 has gear teeth 54 formed thereon for cooperation with a worm gear 56 so that rotation of the worm gear 56 will effect rotation of the rotary gate bushing 46 which rotation can be achieved from the outside of the mold without need for opening or disassembling of the mold.

The lower end of the rotary gate bushing 46 is designed to open and close the holes 44 depending on the rotary position of bushing 46. Referring to FIG. 5, it should be understood that there is no relative vertical movement between the stationary member 40 and the rotary bushing 46, and the relationship between the two is accurately shown in FIG. 3. The vertical spacing at the lower end of bushing 40 and bushing 46 in FIG. 5 is illustrated solely to permit showing of the section lines 6—6 and 7—7.

FIG. 6 looks down at the lower end of the rotary gate bushing 46 and shows a horizontal ledge 60 on which an O-ring 62 is positioned (see FIG. 5). Inside of the ledge 60, there is provided a conical surface 64 which has four spaced sections 66 (see FIG. 6) which are flush with a conical lower end 68 of the hot sprue bushing 40 (see FIG. 3) and four spaced sections 70 which are depressed and therefore spaced below the conical lower end 68 of the hot sprue bushing 40. The conical surface 64 leads to a central hole 72 which communicates with a mold cavity (not shown).

When the rotary gate bushing 46 is rotated to the position shown in FIG. 4 where the four depressed sections 70 of the bushing 46 are aligned with the four holes 44 in the lower end of the hot sprue bushing 40, molten plastic 36 can flow out hole 44 and through spaces created by the depressed sections 70 to the central hole 72 and then into a mold cavity. However, when the rotary gate bushing is rotated to a position where the spaced conical sections 66 are aligned with the four holes 44, the sections 66 are flush against the conical surface 68 at the lower end of hot sprue bushing 40 so as to seal those holes and close the gate. The rotary gate bushing 46 may be rotated to an intermediate position where each of the four holes 44 is partially but not fully open.

The embodiment of FIGS. 3–7 is of the type where the final opening to a mold cavity, the central hole 72 at the lower end of rotary gate bushing 46, is of a constant diameter, although the four holes 44 in the conical lower end of the hot sprue bushing 40 may be fully open or fully closed or partially open depending on the rotary position of rotary gate bushing 46 which can be rotated from outside the mold through worm gear 56. Note that in FIG. 3 the showing of the lower end of rotary gate bushing 46 shows a depressed section 70 on the right side and a section 66 on the left side which is flush with the conical lower end 68 of hot sprue bushing 40. The same is true of FIG. 5.

Figure 8:
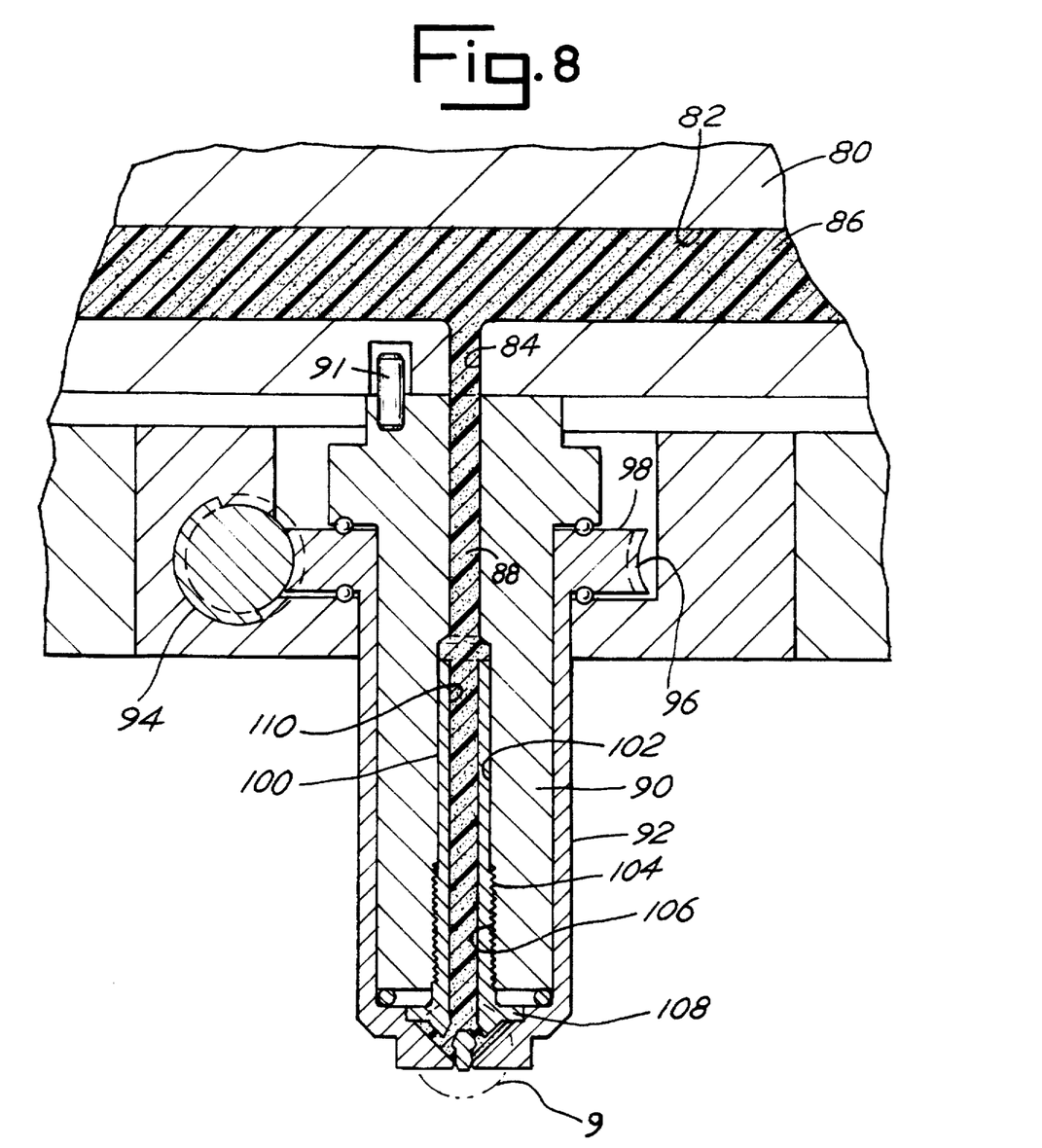
FIG. 8 is a fragmentary vertical sectional view showing a second embodiment of the invention where the gate opening itself is adjustable from outside the mold.

Reference is now made to FIGS. 8–13 which disclose a second embodiment of the invention where the final opening from the gate to a mold cavity comprises an annular passage which can be adjusted to various sizes. FIG. 8 shows a hot manifold 80 having passages 82 and 84 through which molten plastic 86 flows on its way to a mold cavity (not shown) for the molding of plastic parts. The molten plastic flows down through a central opening 88 in a stationary hot sprue bushing 90 which is keyed to the fixed hot manifold 80 by a key or pin shown at 91.

A rotary gate bushing 92 is tubular in shape and surrounds the stationary hot sprue bushing 90. As in the embodiment of FIG. 3, the rotary gate bushing 92 is rotatable from outside the mold by a worm gear 94 which meshes with gear teeth 96 formed on the outside of a flange 98 at the upper end of rotary gate bushing 92.

A hot probe 100 is positioned in an opening 102 in the stationary hot sprue bushing 90 and its lower end has external threads 104 which mesh with internal threads 106 formed in the opening 102. Adjacent the lower end of hot probe 100 there is formed a hexagonal flange 108 which sits in a similarly shaped recess adjacent the lower end of rotary bushing 92. As a result, the hot probe 100 rotates conjointly with the rotary bushing 92.

Moreover, due to the threaded connection between the hot probe 100 and the hot sprue bushing 90, rotation of the hot probe 100 causes it to move vertically within the stationary bushing 90. Therefore, rotation of the rotary gate bushing 92 by the worm gear 94 will cause the hot probe 100 to move upwardly and downwardly between an open gate position and a closed gate position. The hot probe 100 has a central passage 110 through which the molten plastic 86 flows, and when the gate is open, the plastic flows out through the bottom of the rotary bushing 92 to a mold cavity (not shown).

Figure 9:
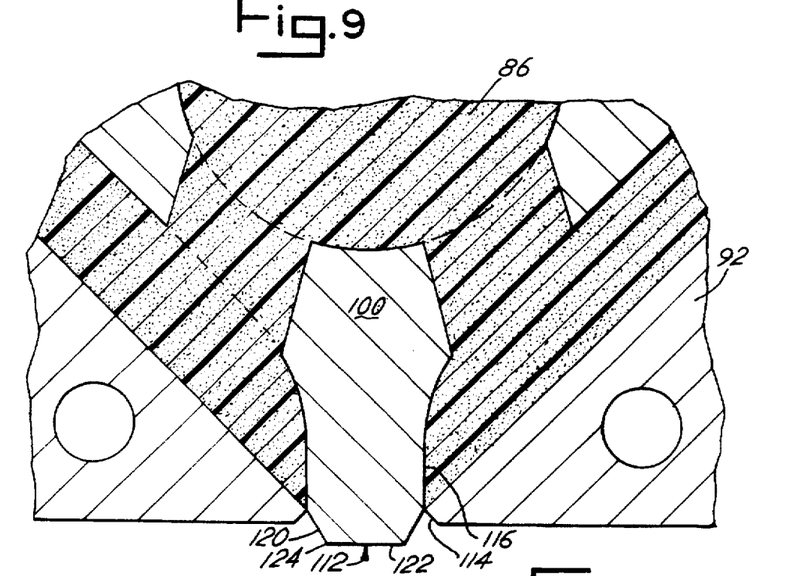
FIG. 9 is an enlarged fragmentary vertical section of the gate area of the embodiment of FIG. 8 with a hot probe member being shown in its lowered, fully closed position.

FIGS. 9–13 illustrate the lower end of the gate assembly shown in FIG. 8 so as to show the manner in which the gate is opened and closed including the manner in which the final opening to the cavity can be adjusted in size unlike the embodiment of FIG. 3. FIG. 9 shows a fully closed position in which the hot probe 100 is in its lowermost position and a lower end 112 is in a position to seal off a central opening 114 formed at the bottom of the rotary gate bushing 92.

The lower end 112 of the hot probe 100 includes a round section 116 having an outer diameter approximately equal to the minimum diameter of the opening 114 in the bushing 92. As a result, when the hot probe 100 is in its lowermost position as shown in FIG. 9, the section 116 of the hot probe closes off the round opening 114 so that molten plastic cannot flow through to the mold cavity.

Figures 10, 11, 12, 13, 14:
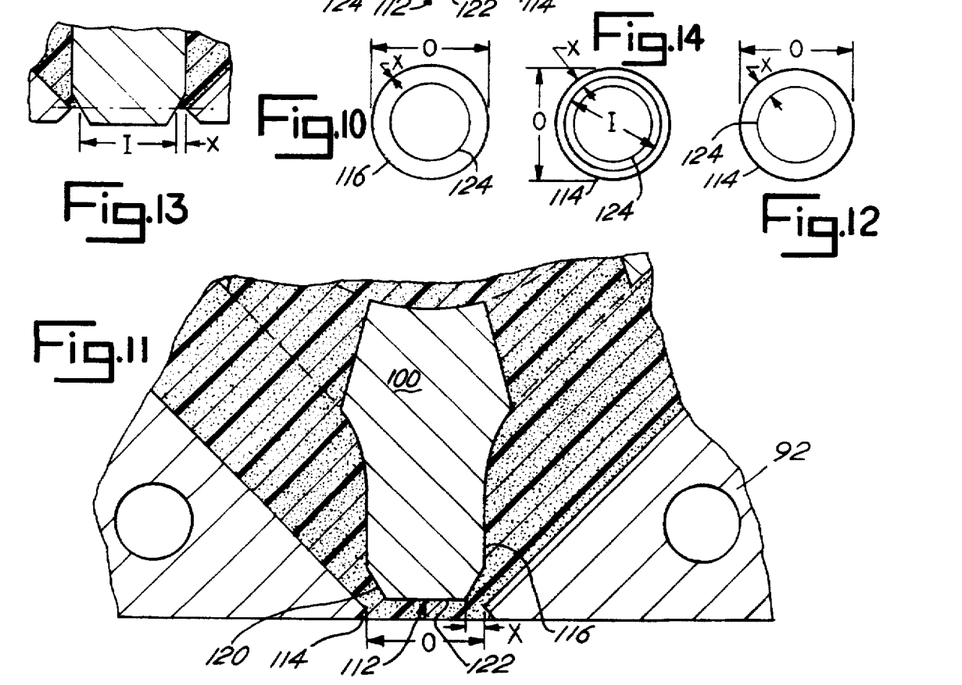
FIG. 10 is a bottom view of the structure shown in FIG. 9.
FIG. 11 is a view similar to FIG. 9 showing the hot probe member in its raised, fully open position.
FIG. 12 is a bottom view of the structure shown in FIG. 11.
FIG. 13 is a fragmentary vertical section similar to the lower end of FIGS. 9 and 11 showing the hot probe member in an intermediate, partially open position.
FIG. 14 is a bottom view of the structure shown in FIG. 13.

In contrast with the foregoing, FIG. 11 shows the hot probe 100 in its fully raised position in which an annular passage is created between the opening 114 and the lower end 112 of the hot probe. In FIG. 11, the letter "O" is shown as representing the minimum diameter of the opening 114 in the lower end of the rotary bushing 92. Below the section 116, the lower end of hot probe 100 is tapered inwardly as shown at 120 and it terminates in a reduced diameter flat bottom 122. FIG. 11 uses the letter "X" to designate the width of an annular passage through which molten plastic can flow in the fully open position of FIG. 11.

FIG. 10 is a bottom view of FIG. 9 showing the fully closed position so that the width "X" of the annular passage is zero, the outer diameter of the lower end of the hot probe 100 being shown at 116 and the reduced diameter being shown at 124. Because the outer diameter 116 of the hot probe is approximately equal to the minimum diameter of the round opening 114, the gate is closed.

FIG. 12 is a bottom view of FIG. 11 showing the fully open position, the letter "O" represents the diameter of the opening 114, and 124 represents the reduced diameter of the extreme lower end of the hot probe 100, so that the difference between the two which is indicated as "X" designates the width of an annular passage through which molten plastic may flow.

FIG. 13 shows an intermediate position where the lower end 112 of the hot probe is intermediate the closed position of FIG. 9 and the fully open position of FIG. 11. FIG. 14 is a bottom view of FIG. 13 and in both FIGS. 13 and 14 the letter "T" is used to designate the diameter of that portion of the lower end 112 of the hot probe which is in line with the round opening 114 at the lower end of rotary bushing 92. Thus, the difference between the "T" diameter and the diameter 114 of the central opening determines the width "X" of an annular passage.

It will thus be understood that due to the tapered lower end 112 of the hot probe 100, when in the lowered position of FIG. 9 the opening 114 is closed, when in the fully raised position of the hot probe 100 as shown in FIG. 11, the width "X" of the annular passage is a maximum, and in an intermediate position as shown in FIGS. 13 and 14, the width "X" creates an annular open passage, but "X" is less than in the fully open position of FIGS. 11 and 12.

The foregoing feature of the invention is of considerable importance for several reasons. One major advantage is that the final opening to the mold cavity can be adjusted in size. The outer diameter of the annular passage is the diameter 114 of the opening which is fixed, but the inner diameter of the annular passage is the diameter of that portion of the tapered lower end of the hot probe 100 which is in line with the diameter 114, and that inner diameter varies due to the taper 120 of the lower end 112 of the hot probe, depending on the vertical position thereof.

The embodiment of FIGS. 8–14 is particularly suited for use in the injection molding of thin-walled objects such as thin-walled buckets. In the molding of a plastic part, it is important to completely fill the mold cavity before the molten plastic begins to harden due to cooling as it enters the mold. If an operator unduly increases the speed or pressure of the molten plastic to reduce the time for filling a mold cavity, that will increase the heat of the plastic and possibly degrade the material, which can then increase the cooling time, which means lengthening the mold cycle. The material must cool and harden before a part can be ejected and the next cycle begun.

The tubular passage created by the embodiment of FIGS. 8–14 solves the foregoing problem. The velocity or volume of plastic flow depends on the area of the opening leading to the mold cavity. As the hot molten material passes through the gate, it is desirable that the material cool rapidly in order to reduce the cycle time. Where the opening to the cavity is a single round opening, the surface area of the gate is relatively small so that absorption of heat is limited. In contrast, with an annular passage of the same open area, the gate surface area available to receive heat from the plastic is substantially larger, so that cooling time will be reduced.

It is desirable to force plastic material into a mold cavity as fast as possible without unduly increasing the heat of the material. If you have only one round hole leading to the cavity, such as the hole 12 in FIGS. 1 and 2, an operator can increase the flow rate only by opening up the opening or attempting to force the material through faster. If you force the material through faster, you create frictional heat so the temperature of the molten material flowing through the gate may be higher than the incoming material supplied to the gate. As noted above, such an increase in temperature can cause problems of degradation and stress, and can increase the cooling time.

On the other hand, if the gate opening is a round hole as shown at 12 in FIGS. 1 and 2, and one increases the size of that hole, the result, after filling a cavity, will be that there is a large mass of material in the gate area filling the hole so that the time for that plastic in the gate area to freeze is increased significantly. Thus, opening up a round hole in a gate opening to get faster filling of a cavity can result in slower freezing of the plastic in the gate area, and an operator cannot begin the next cycle until that material freezes.

An important advantage of the present invention is that, instead of simply opening up a round opening by increasing its diameter, the present invention utilizes an annular opening or tubular gate which can be increased in diameter without increasing the time for plastic material in the gate area to freeze so the next cycle can begin. Thus, by using an annular opening in the gate, one can increase the flow rate and achieve faster filling of a mold cavity without the disadvantage of forcing material at an increased rate so as to produce friction heat, and without the disadvantage of having a large mass of molten material in the gate area which increases freezing time at the gate.

Also, because of the tapered lower end of the hot probe 100 in FIGS. 9 and 11, an operator can vary the size of the annular opening by simply moving the hot probe vertically between the closed position of FIG. 9 and the fully open position of FIG. 11. Also, when the hot probe 100 is moved to an intermediate or partly open position as in FIG. 13, the relatively small annular passage is quite short and thus avoids creation of friction. In contrast, as the prior art probe shown at 14 in FIG. 1 is moved down toward a closed position, a relatively long, narrow flow area is created leading to the opening 12, with the result that forcing the molten material through such a long and narrow flow area tends to create frictional heat.

The foregoing invention is especially adapted for the molding of thin-walled objects such as thin-walled containers or buckets. The reason is that in the molding of thin-walled containers, it is necessary to inject the plastic material at a higher pressure in order to completely fill the mold cavity before the materials freeze. It is important to be able to do that without creating frictional heat and stress because of the molten plastic being forced through the gate at higher velocity and pressure as needed to fill a thin-walled cavity before freezing occurs in the cavity. In the thin-walled cavity, the molten plastic will freeze more rapidly than in other types of cavities, and the cavity must be filled before such freezing occurs. Thus, the use of a tubular gate or annular gate passage offers major advantages in the injection molding of thin-walled containers or other objects.

In operation, the adjustable mold gate shown in FIGS. 8–14 is preferably not closed at the end of a cycle. In contrast, in the embodiment of FIGS. 3–7, the rotary gate bushing 46 is rotated to an open position to allow molten plastic to flow through opening 72 to fill a mold cavity, and thereafter the rotary bushing 46 is rotated to its closed position until after the material freezes and the plastic part is ejected. However, the preferred method of operating the gate of FIGS. 9–14 is to adjust the annular or tubular gate opening to desired degree of opening, and then to leave it in that position, as opposed to opening and closing the gate each cycle.

Thus, referring to FIG. 11, the hot probe 100 is set to a desired open position as shown in that figure, or in an intermediate position as shown for example in FIG. 13, a cycle begins by injecting molten plastic through the annular passage or tubular gate defined between the tapered lower end of the hot probe 100 and the minimum diameter of opening 114, the mold cavity is filled, and the plastic in the mold cavity and in the gate area is allowed to freeze. After such freezing occurs, the mold is opened and the part is ejected.

Referring again to FIG. 11, the ejected part will include a small amount of plastic disposed immediately beneath the hot probe 100 as shown in FIG. 11, which piece will break away in tension across the distance shown as "X". After the part has been ejected, molten plastic will again be passed through the annular gate opening and into a mold cavity for the next cycle without need to close and open the gate which remains in a selected partially open position.

In using the mold gate of FIGS. 9–14, an operator will know the cavity wall thickness, the viscosity of the molten material, and the flow distance of a thin wall container to be molded, and assuming an efficient mold cooling arrangement, the approximate gate size and temperature of the plastic going through the gate can be calculated using a definite injection pressure that will fill the cavity to make a container to specifications at the fastest cycle.

The foregoing adjustable gate was designed to permit fine tuning of the gate size to achieve cavity-to-cavity fill time balance and at the same time adjust the gate size to fill the cavity properly without allowing the gate set-up time to exceed the nominal wall thickness time. Moreover, such adjustment of the gate size can be accomplished from outside the mold while the mold is running production.

After the hot probe 100 is set to the proper heat and the calculated injection pressure set, it should be possible to adjust the vertical position of the hot probe to adjust the tubular gate area opening until the gate takes longer to set properly than the nominal wall. If at that time the cavity is not properly filled, the temperature should not be raised, but rather the tubular gate passage should be enlarged by opening the diameter of the hole shown at 114 in FIG. 11, by raising hot probe 100.

It is therefore a preferred method of operation in using the adjustable gate shown in FIG. 11 to leave the gate in a selected, partially open position, allow the plastic to freeze not only in the mold cavity but also in the gate area, and then open the mold at the parting line and eject the part. As indicated above, when using the mold design shown in FIG. 11, the part will break off in tension across the width shown as "X" which is the weakest section.

As the "X" dimension gets larger, it will take longer for the plastic in the gate area to freeze, but that is not a problem as long as it freezes by the time the plastic in the mold cavity has frozen, because in that event the cycle is not being slowed in order to get freezing in the gate area. It is disadvantage of a gate design if the cycle is slowed because it is necessary to wait for freezing of the plastic in the gate area even after the piece part in the cavity has cooled. The adjustable gate of the present invention permits an operator to control the time of cooling or freezing in the gate area to avoid such disadvantage.

Figure 15:
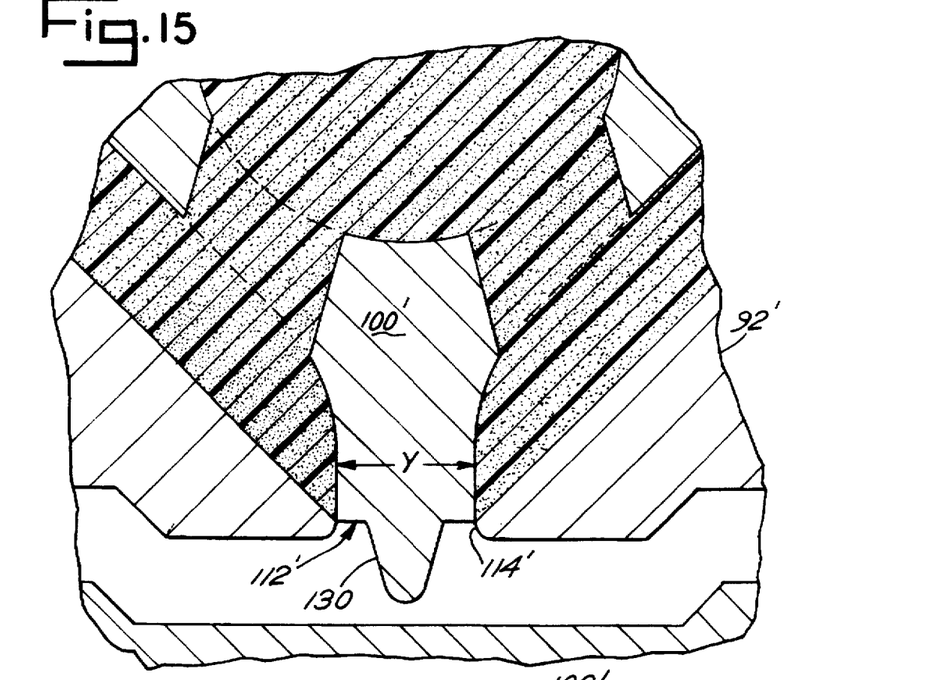
FIG. 15 is a fragmentary vertical section showing another embodiment where the gate opening itself is adjustable from outside the mold, the lower end of the hot probe member having a shape different from FIG. 9, and the probe being shown in its lower closed position.
Figure 16:
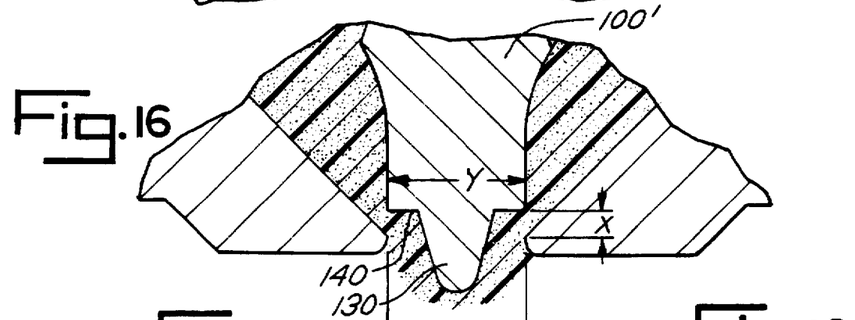
FIG. 16 is a fragmentary view similar to FIG. 15 showing the hot probe in its raised, fully open position.

Reference is now made to FIGS. 15 and 16 which show a variation of the embodiment of FIGS. 9–14, the main difference being in the manner in which the piece part breaks off at the gate when a part is ejected at the end of a cycle. As described above in connection with FIG. 11, at the end of a cycle the piece part is broken off in tension across the section shown as "X" which is the weakest area. In the embodiment shown in FIGS. 15–18, the piece part breaks away in shear rather than in tension due to a variation in the shape of the lower end of a hot probe member 100'.

FIG. 15 shows a fully closed position in which the hot probe 100' is in its lowermost position, and a lower end 112' is in a position to seal off a central opening 114' formed at the bottom of a rotary gate bushing 92'.

Comparing FIG. 9 with FIG. 15, the lower end of the hot probe 100 in FIG. 9 is tapered at 120 with a flat bottom 122. In FIG. 15, the lower end of hot probe 100 is tapered as at 130, but the tapered lower end is much narrower than in FIG. 9. The result is that when viewing the open position as shown in FIG. 16, it can be seen that when the part is ejected and the plastic material beneath the hot probe 100 is pulled down and broken off, the break will occur along vertical shear lines as shown at "X". Thus, in the embodiment of FIGS. 9–14, the plastic part breaks away in the gate area by a tensile break during ejection, whereas in the embodiment of FIGS. 15 and 16, the plastic pat breaks away in shear. The main structural difference is the narrow shape of the tapered lower end of the hot probe 100 in FIG. 15.

Figure 17:
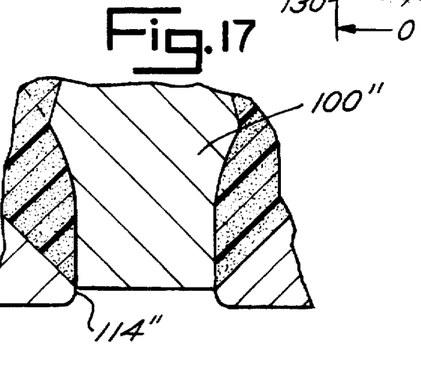
FIG. 17 is a fragmentary vertical section showing a further embodiment which differs from FIG. 15 in that the bottom of the hot probe member is flat.
Figure 18:
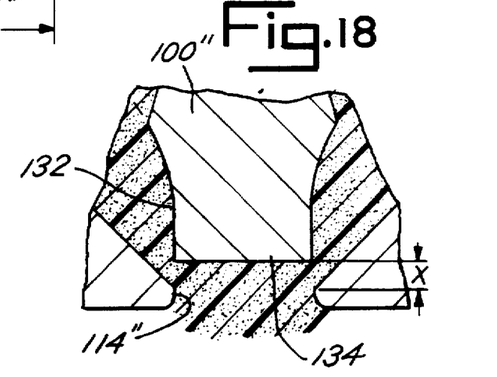
FIG. 18 is a view similar to FIG. 17 showing the hot probe member in its raised, fully open position.

FIGS. 17 and 18 shows a modified form of gate where the part breaks away in shear as in the embodiment of FIGS. 15 and 16. In FIGS. 17 and 18, the lower end of a hot probe 100" is cylindrical in shape as shown at 132, and has a flat bottom 134. The result is that when in an open position as shown in FIG. 18, the part when ejected will break away in shear along the vertical area shown as having a height "X".

In the embodiment of FIGS. 9–14, the annular gate opening or tubular gate has a constant outer diameter as shown at "O" in FIG. 11, and has a variable inner diameter depending on the vertical position of the hot probe 100 due to the tapered lower end 120. In the embodiment of FIGS. 15 and 16, the annular gate opening or tubular gate has a diameter shown at "O" in FIG. 16 which does not vary, and it is the height of the tubular passage which varies depending on the vertical position of hot probe 100', so the dimension shown at "X" in FIG. 16 varies to vary the area of the gate opening. The same is true in the embodiment of FIGS. 17 and 18, but a different structure is used for the lower end of the hot probe 100" which does not require a taper.

Thus, in FIGS. 15 and 16 the lower end of the hot probe 100' has a conical like nose with a rounded bottom, and in FIGS. 17 and 18 the lower end of hot probe 100" is cylindrical with a flat bottom, but the result is similar, and in each case a vertical shear breakaway area is created which has a constant diameter and a variable height depending on the vertical position of the hot probe 100'.

Some materials after freezing will break away more readily in tension, and some materials will break more readily in shear. Thus, an operator can choose between the embodiment of FIGS. 9–14 where a tensile break is desired, and the embodiments of FIGS. 15–16 and FIGS. 17–18 when a shear break is desired, depending on the characteristics of the plastic material. In using all of the foregoing embodiments, the preferred method is to set the hot probe to achieve a desired tubular gate opening area, and leave the gate set at the selected opening without need to open and close the gate each cycle.

The major advantage of being able to adjust the area of the gate opening in any of the embodiments of FIGS. 8–18 is that the operator can adjust the gate opening so that freezing of the plastic in the gate area will not take longer than the freezing of the plastic in the mold cavity, so the gate can be adjusted in harmony with the part as contrasted with use of a fixed size gate opening as shown at 12 in FIGS. 1 and 2.

In prior designs as shown in FIGS. 1 and 2, and also in the design shown in FIGS. 3–7 which is preferred for other than thin-walled containers, an operator must attempt to adjust the temperature and pressure and speed of material being forced into the mold cavity in an attempt to balance the freezing time of the piece part in the mold cavity and the freezing time of the plastic in the gate area.

If one is interested in using a gate where the parts break away in shear as shown in FIGS. 15 and 16 or in FIGS. 17 and 18, it is possible to manufacture the tubular gate opening to a larger or smaller size without varying the vertical dimension shown at "X". Thus, the round opening shown at "O" in FIG. 16 can be made larger or smaller, and the diameter of the probe shown at "Y" in FIGS. 15 and 16 can be made larger or smaller a similar amount, in which case the gate opening can be varied without changing the vertical "X" dimension.

The same principle applies in the embodiment of FIG. 11 where the diameter "O" of the round hole 114 can be varied, and the diameter of the lower end 122 of the hot probe 100 can be varied in a similar manner, and in that way the tubular gate opening can be made larger or smaller without varying the "X" dimension which is the width of the annular passage.

As explained above, the embodiment of FIGS. 15 and 16 and the embodiment of FIGS. 17 and 18 achieve similar results in that each provides a gate where the piece part will break off along a vertical shear path "X". However, the embodiment of FIGS. 15 and 16 will have advantages in certain situations with respect to freezing of the plastic material in the gate area.

In FIG. 18, all of the material in the gate area beneath the lower end 134 of the hot probe 100 must freeze before the part can be ejected. In FIG. 16, the same is true with respect to material beneath the lower surface 140 of the hot probe 100. However, because of the downwardly projecting nose 130, there is less material in the gate area to freeze in the FIG. 16 embodiment. As a result, in cases where the diameter "O" in FIG. 16 is large, thus increasing the amount of plastic material in the gate area which must freeze, the FIG. 16 embodiment may be more desirable than the FIG. 18 embodiment, because the nose 130 will displace some of the plastic material and thus reduce the cooling time for plastic in the gate area.

Figure 19:
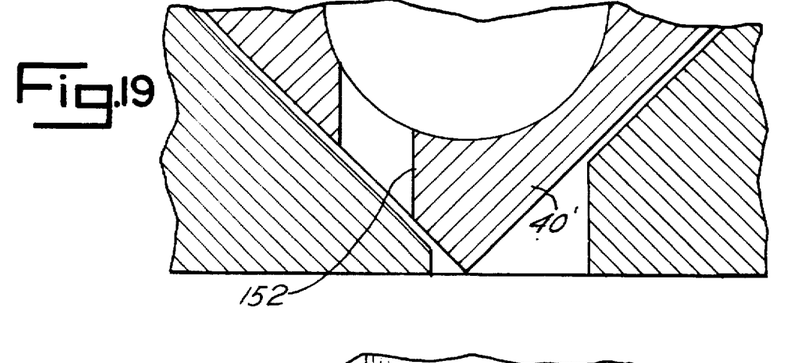
FIG. 19 is a fragmentary vertical section of a further embodiment which has a fixed gate opening as in the embodiment of FIGS. 3–7, but where the opening at the lower end of the outside gate member has a three-legged shape rather than a single central opening as in FIGS. 3–7.
Figure 20:
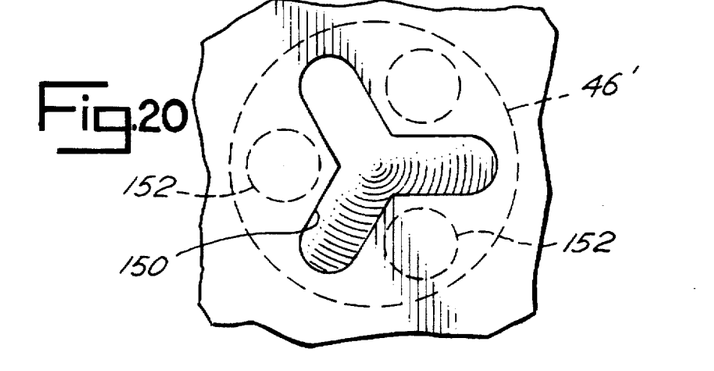
FIG. 20 is a bottom view showing the three-legged opening in the bottom of the outside member of FIG. 19.

Reference is now made to FIGS. 19 and 20 which show a modified version of the embodiment of FIGS. 3–7. The modified version is the same as shown in FIGS. 3–7 except for a change at the lower end of the rotatable gate bushing 46. In the embodiment of FIGS. 3–7, the lower end of gate bushing 46 has a central hole shown at 72 in FIG. 5, and it has four depressed flow areas 70 leading to the hole 72. FIG. 20 is a bottom view which shows a three-legged opening 150 in the lower end of a rotatable gate bushing 46. FIGS. 19 and 20 also show three round holes 152 in the lower end of a stationary hot sprue bushing 40. FIG. 20 shows the gate in a closed position but when the rotary gate bushing 46' is rotated so the three legs of the opening 150 are aligned with the three holes 152 in the stationary hot sprue bushing 40', plastic material will flow through the lower end of bushing 40' and through the three-legged opening 150 to a mold cavity. Partially open positions are also possible as previously described.

In certain applications, the modified embodiment of FIGS. 19 and 20 will have an advantage over the embodiment shown in FIGS. 3-8 in that it is less susceptible to having plastic material hang up or become stuck between the stationary hot sprue bushing 40' and the rotatable gate bushing 46'.

Figure 21:
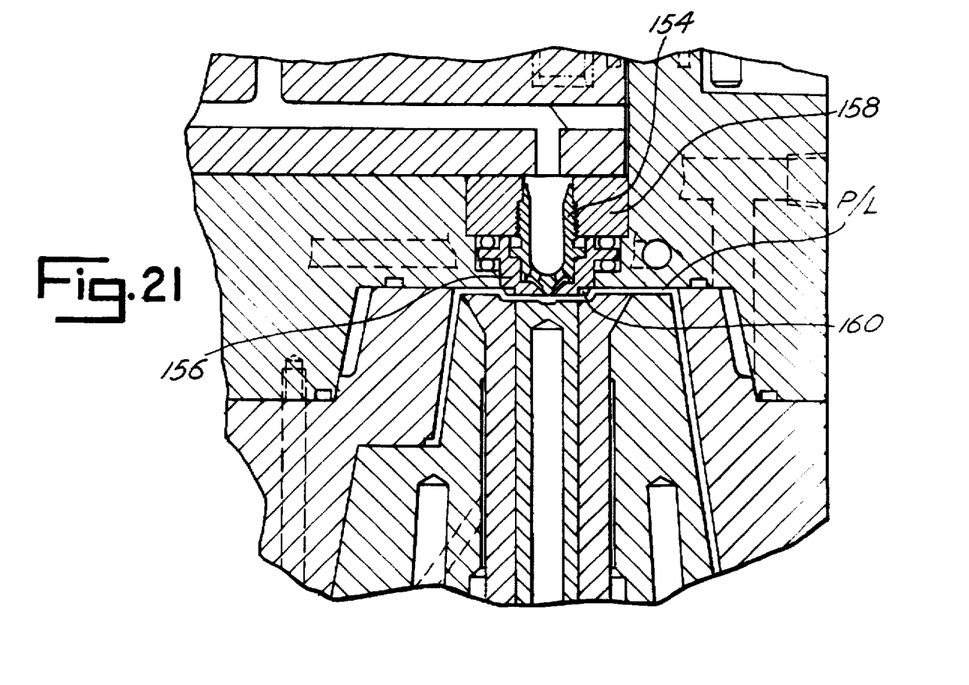
FIG. 21 shows a further embodiment of the invention of FIG. 8 where a rotatable outer member has notches for receiving an adjustment tool for rotating the outer member, access to the rotatable member for adjustment purposes being available when the mold is opened at its parting line.
Figure 22A:
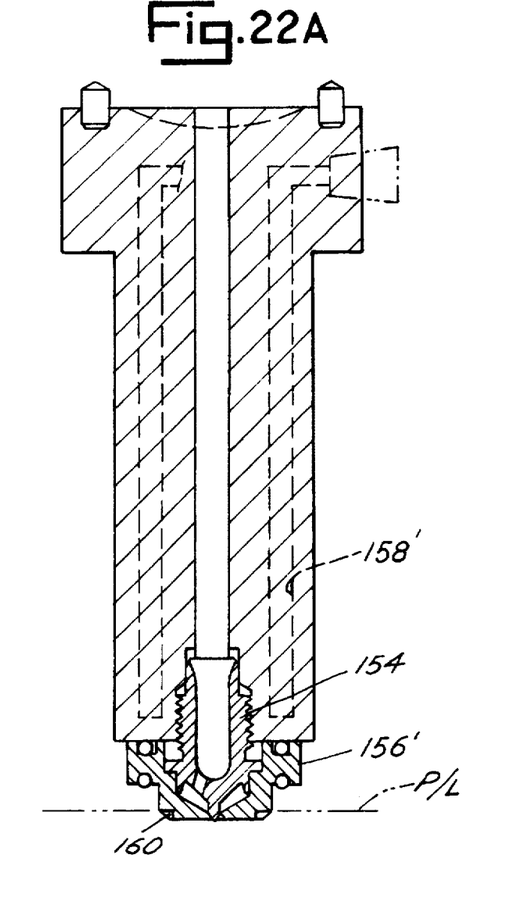
FIG. 22a is a bottom view of the structure of FIG. 22.
Figure 22B:
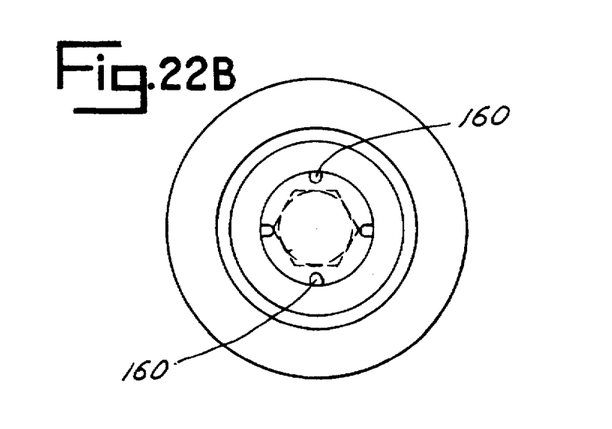
FIG. 22 is a view similar to FIG. 21 but with a stationary mold member which is substantially greater in height than in the embodiment of FIG. 21.
Figures 23, 24:
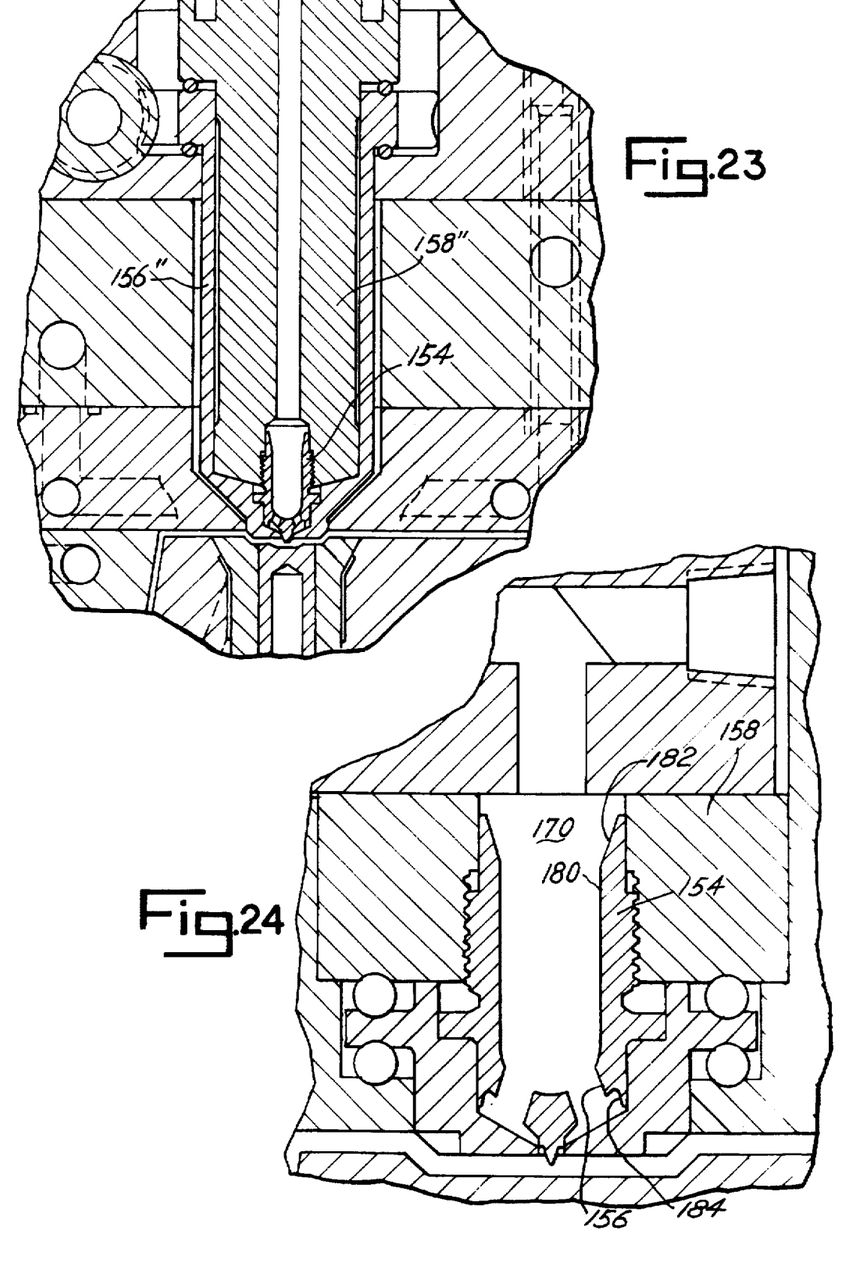
FIG. 23 is a vertical sectional view similar to FIGS. 21 and 22 except that the mold is adjustable from outside the mold without need to open the mold, such adjustment being through a worm gear which rotates the outside rotatable mold member.
FIG. 24 is an enlarged vertical sectional view of the gate of FIGS. 21–23 showing a vertically movable hot probe member having a runner extending therethrough for the flow of molten plastic and having upper and lower ends designed to expand radially under the internal pressure of such molten plastic to effect improved sealing against leakage of the molten plastic, the hot probe member being shown in its lowered, fully closed position.

Reference is now made to FIGS. 21-25 which show embodiments similar in many respects to the embodiment of FIGS. 8-14 but show an improved design of a hot probe 154. The hot probe 154 is movable vertically to adjust the gate opening in the same manner as the hot probe shown at 100 in FIG. 8. FIG. 21 shows a rotatable gate bushing 156' and a stationary bushing 158'. FIG. 22 shows a similar rotary gate bushing 156' but with a stationary bushing 158' which has much greater height than the stationary bushing 158 of FIG. 21. FIG. 23 shows the same hot probe 154 together with a rotary gate bushing 156 and a stationary bushing 158."The embodiment of FIG. 23 permits adjustment of the vertical position of the hot probe 154 from outside the mold through use of a worm gear in the same manner as previously described in connection with FIG. 8. However, FIGS. 21 and 22 are different because in those embodiments the size of the gate opening is adjusted by manual rotation of the gate bushing 156 or 156' when the mold is opened at the parting line.

In FIG. 21 the parting line is shown as P/L, and the same is true in FIG. 22. Thus, when the mold is opened, an operator gains access to the lower face of the rotatable gate bushing 156 or 156'. As shown in FIGS. 21 and 22, and also in the bottom view of FIG. 22a, the rotary gate bushings 156 and 156' have four notches 160 which can be engaged by a tool to permit an operator to manually rotate the gate bushing and thereby adjust the vertical position of the hot probe 154.

It will sometimes be preferable to provide for manual adjustment of the rotary gate bushing 156 as in FIGS. 21 and 22 where a mold has a unusually large number of mold cavities and mold gates, for example, 48 gates. In other embodiments, where the mold has a lesser number of cavities and gates, for example, 16 gates, it may be more practical to provide for adjustment of the rotary gate bushing from outside the mold as in FIG. 23.

Figure 25:
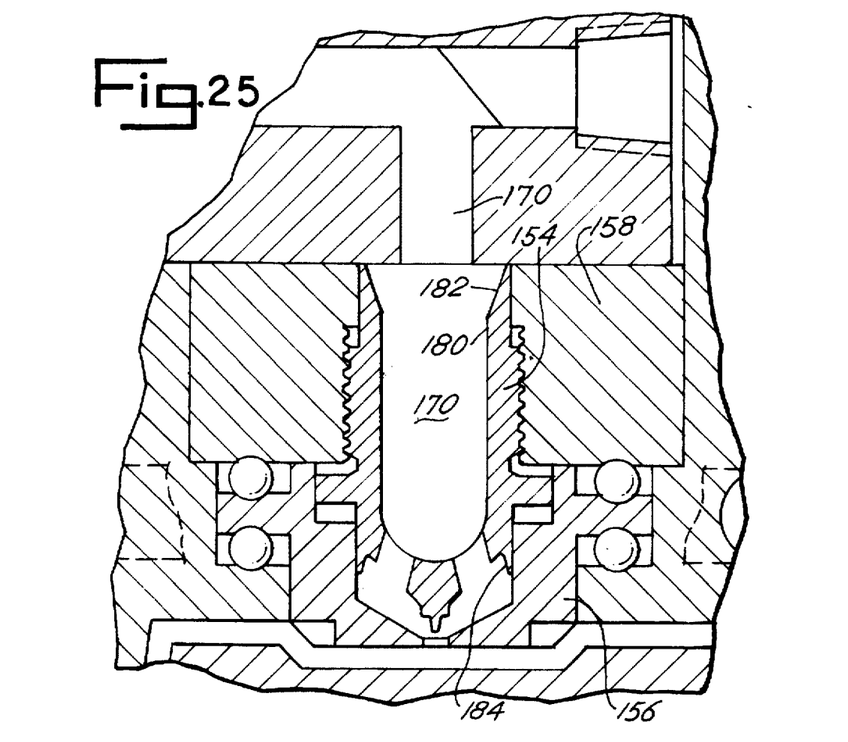
FIG. 25 is a view similar to FIG. 24 showing the hot probe member in its raised, fully open position.

FIGS. 24 and 25 are enlarged views of the modified hot probe 154 of FIG. 21 and show the relationship between hot probe 154 and rotary gate bushing 156 and stationary bushing 158. FIG. 24 shows the hot probe 154 in its fully down, closed position, and FIG. 25 shows the hot probe 154 in its raised, fully open position. As noted above, the hot probe 154 is moved vertically in the same manner as described in connection with FIG. 8. Also, the flow of the plastic material 170 through the lower end of the gate assembly is the same as described in connection with FIGS. 11 and 16.

The showing of the lower end of hot probe 154 in FIGS. 24 and 25 illustrates two different versions. The left side of the lower end of hot probe 154 is intended to represent the FIG. 16 embodiment where the piece part breaks away in shear, and the right side of the lower end of hot probe 154 in FIGS. 24 and 25 is intended to represent the FIG. 11 embodiment where the piece part breaks away in tension.

The primary purpose of FIGS. 24 and 25 is to illustrate an improved sealing arrangement between the hot probe 154 and the rotary gate bushing 156 and the stationary bushing 158 as will now be described. The hot probe 154 of FIGS. 24 and 25 has a relatively large diameter central passage 180 through which molten plastic flows 170 downwardly to the area of the adjustable gate. Such molten plastic is passed through the hot probe 154 at a relatively high pressure. In addition, the upper and lower ends of the hot probe are designed to expand radially outwardly in response to such pressure.

As shown in FIGS. 24 and 25, the hot probe 154 has an upper end which tapers at 182 to a thinner wall with the result that the upper end is more capable of expanding radially outwardly under the pressure of the molten plastic 170. Similarly, the lower end is tapered at 184 to a much thinner wall thickness. As a result, under internal pressure from the molten plastic 170, the upper end of hot probe 154 will expand radially outwardly at 182 against the surrounding stationary bushing 158, and the lower end of hot probe 154 will expand radially outwardly at 184 against the surrounding rotary gate bushing 156.

The previously described adjustment of the vertical position of the hot probe 154 through rotation of rotary gate bushing 156 is accomplished at a time when there is no high pressure molten plastic inside the hot probe 154, because when the latter expands radially outwardly at its upper and lower ends 182, 184, it is not adapted for vertical movement relative to rotary bushing 156 and stationary bushing 158. When such internal pressure is applied, the fact that the upper and lower ends of hot probe 154 expand radially outwardly against the surrounding members achieves effective sealing to prevent molten plastic from leaking between the contacting surfaces of the hot probe 154 and the rotary gate bushing 156 and between the contacting surfaces of the hot probe 154 and the stationary bushing 158.

Figure 26:
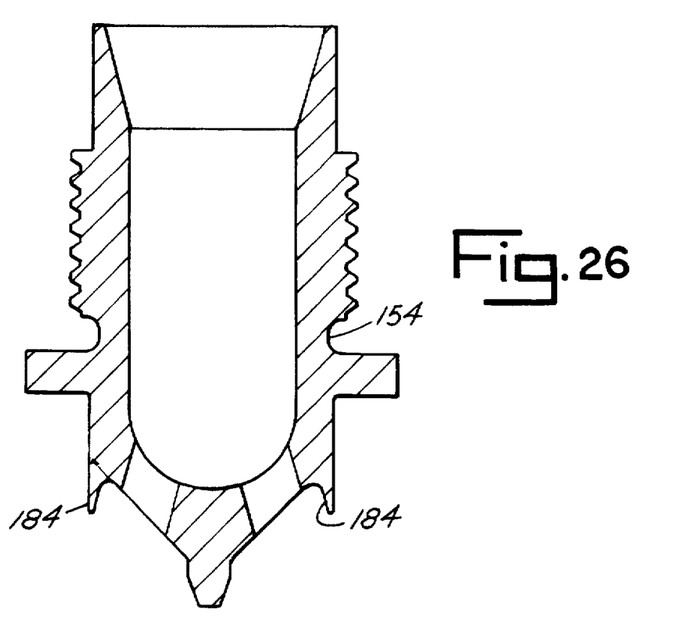
FIG. 26 is a detailed elevational view of the hot probe member of FIGS. 24 and 25.

FIG. 26 is a detail view of the hot probe 154 with arrows applied to illustrate the outward pressure and resulting radial expansion at the upper end of the hot probe to effect sealing, and the outward pressure and radial expansion at the lower end of the hot probe to effect sealing. In particular, it is important to note the relatively thin circumferential section 184 at the extreme lower end of hot probe 154 which is where the primary radial expansion and sealing will occur relative to the rotary gate bushing 156.

When using the gate shown in FIGS. 8-13, or any of the other embodiments where the size of the gate opening is adjustable, an operator has the option of leaving the gate at one adjusted position of repeated cycles, or the operator may change the gate opening for each cycle, i.e., for each injection of plastic into a mold cavity.

Note also that one gate opening may be used for filling a mold cavity, and a different gate opening may be selected for packing. Packing involves injecting a small additional amount of plastic into a mold cavity after the plastic material therein has hardened and shrunk, the purpose being to eliminate any space created due to the shrinking of the plastic during hardening. In some situations, the optimum gate opening may be different for filling and packing.

Which is claimed is:

1. A mold where molten plastic is conducted to flow through a gate to a mold cavity for the injection molding of plastic parts, said mold having an adjustable gate for controlling said flow of said molten plastic to said mold cavity, said gate comprising, in combination, a radially outer gate member having a round, central opening at a lower end thereof through which said molten plastic flows to said mold cavity, a hot probe extending vertically within said radially outer mold gate member with a lowermost end of said hot probe located adjacent to said central opening, said hot probe having a cylindrical section with a diameter approximately equal to a diameter of said round, central opening, said hot probe being adjustable vertically between a raised fully-open position, and a lowered fully-closed position where a lower cylindrical end of said cylindrical section of said hot probe is located in said central opening to close said gate, said hot probe being adjustable to intermediate vertical positions between said fully-open and fully-closed positions to partially-open positions where said lowermost end of said hot probe cooperates with a portion of said radially outer mold gate member, which portion surrounds said central opening, to define a ring-shaped passage through which said molten plastic can flow to said mold cavity, said ring-shaped passage having an open area which varies depending on said vertical position of said hot probe, and apparatus for adjusting said vertical position of said hot probe to vary said open area of said ring-shaped passage.

2. The mold as defined in claim 1 where said lower cylindrical end of said cylindrical section of said hot probe cooperates with said portion of said radially outer mold gate member, which portion surrounds said central opening, to define said ring-shaped passage to have a constant diameter but a variable height depending on said vertical position of said hot probe, said height being zero when said hot probe is in said fully-closed position to close said gate and said height increasing to increase said area of said ring-shaped passage as said hot probe is raised from said lowered, fully-closed position to said raised, fully-open position.

3. The mold as defined in claim 2 where a bottom of said cylindrical section of said hot probe is substantially flat.

4. The mold as defined in claim 2 where a bottom of said cylindrical section of said hot probe includes a downwardly projecting tapered nose which displaces said plastic and thereby reduces cooling time for said plastic in the area of said gate.

5. A mold where molten plastic is conducted to flow through a gate to a mold cavity for the injection molding of plastic parts, said mold having an adjustable gate for controlling said flow of said molten plastic to said mold cavity, said gate comprising, in combination; a radially outer gate member having a round, central opening at a lower end thereof through which said molten plastic flows to said mold cavity, a hot probe extending vertically within said radially outer mold gate member with a lowermost end portion of said hot probe located adjacent to said central opening, said portion having a cross-section approximately equal to a minimum diameter of said round, central opening, said hot probe being adjustable vertically between a raised, fully-open position, and a lowered, fully-closed position where said lowermost end portion of said hot probe is located in said central opening to close said gate, said hot probe being adjustable to intermediate vertical positions between said fully-open and fully-closed positions to provide partially-open positions where said lowermost end portion of said hot probe cooperates with a portion of said radially outer mold gate member, which gate member portion surrounds said central opening, to define a ring-shaped passage through which said molten plastic can flow to said mold cavity, said ring-shaped passage having an open area which varies depending on said vertical position of said hot probe, and apparatus for adjusting said vertical position of said hot probe to vary said open area of said ring-shaped passage, said apparatus comprising a stationary hot sprue bushing, said radially outer mold gate member comprising a rotary gate bushing which surrounds said stationary hot sprue bushing, and said hot probe being disposed inside said stationary hot sprue bushing and being conjointly rotatable with said rotary gate bushing, said hot probe being threaded into said stationary hot sprue bushing to be vertically movable therein upon rotation of said rotary gate bushing, and said apparatus for adjusting said vertical position of said hot probe comprising apparatus for rotating said rotary gate bushing.

6. The mold as defined in claim 5 where said lowermost end of said hot probe is tapered inwardly as it progresses downwardly to form a truncated, conical portion which cooperates with said portion of said radially outer mold gate member, which portion surrounds said central opening, to define said ring-shaped passage, which passage has a constant outer diameter and a variable inner diameter depending on said vertical position of said hot probe.

7. The mold as defined in claim 5 where said lowermost end of said hot probe is tapered inwardly as it extends downwardly to form a truncated, conical portion which cooperates with said portion of said radially outer mold gate member, which portion surrounds said central opening to define said ring-shaped passage, which passage has a constant outer diameter and a variable inner diameter dependent on said vertical position of said hot probe.

8. The mold of claim 5 in which said lower cylindrical end of the cylindrical section of said hot probe cooperates with said portion of said radially outer mold gate member, which portion surrounds said central opening, to define said ring-shaped passage to have a constant diameter but a variable height depending on said vertical position of said hot probe, said height being zero when said hot probe is in said fully-closed position to close said gate, and said height increasing to increase said area of said ring-shaped passage as said hot probe is raised from said lowered, fully-closed position to said raised, fully-open position.

9. The mold of claim 5 in which a bottom of said portion of said hot probe includes a downwardly projecting, tapered nose which displaces said plastic and thereby reduces cooling time for said plastic in the area of said gate.

10. A mold gate as defined in claim 5 where said apparatus for rotating said rotary gate bushing comprises a gear system substantially located outside of said mold and associated with said rotary gate bushing whereby said area of said annular passage may be adjusted from outside the mold when the mold is running without need for opening or disassembling of the mold.

11. A mold gate as defined in claim 5 where said hot probe is mounted with its lower end inside of said rotary gate bushing and its upper end inside of said stationary sprue bushing, and a passage for molten plastic is formed through the center of said hot probe whereby when said molten plastic is forced through said hot probe under high pressure it causes said hot probe to expand radially outwardly into firm engagement with both said stationary sprue bushing at its upper end and said rotary gate bushing at its lower end thereby effecting a seal to prevent leakage of said molten plastic.

12. A mold gate as defined in claim 5 where said hot probe is formed with a relatively thin upper end and a relatively thin lower end to facilitate radial expansion of said upper and lower ends when molten plastic is forced under high pressure through said hot probe, with the result that the higher the pressure of said molten plastic the greater the seal effected by the radial expansion of said upper and lower ends of said hot probe.

13. A mold gate as defined in claim 5 where said means for rotating said rotary gate bushing comprises elements formed on the bottom of said rotary gate bushing to cooperate with a tool so an operator can manually adjust the rotary position of said rotary gate bushing when said mold is opened at its parting line, whereby said area of said annular passage may be adjusted without need for disassembling of the mold.

14. The mold as defined in claim 2 or 3 or 4 or 5 or 6 including a stationary hot sprue bushing, said radially outer mold gate member comprising a rotary gate bushing which surrounds said stationary hot sprue bushing, and said hot probe being disposed inside said stationary hot sprue bushing and being conjointly rotatable with said rotary gate bushing, said hot probe being threaded into said stationary hot sprue bushing to be vertically movable therein upon rotation of said rotary gate bushing, and said apparatus for adjusting said vertical position of said hot probe comprising means for rotating said rotary gate bushing.

15. The mold as defined in claim 14 where said means for rotating said rotary gate bushing comprises gear means located outside of said mold and associated with said rotary gate bushing whereby said area of said ring-shaped passage may be adjusted from outside the mold when the mold is running without need for opening or disassembling of the mold.

16. The mold as defined in claim 14 where said means for rotating said rotary gate bushing comprises elements formed on the bottom of said rotary gate bushing to cooperate with a tool so an operator can manually adjust the rotary position of said rotary gate bushing when said mold is opened at its parting line, whereby said area of said ring-shaped passage may be adjusted without need for disassembling of the mold.

17. A mold as defined in claim 14 where said hot probe is mounted with its lower end inside of said rotary gate bushing and its upper end inside of said stationary sprue bushing, and a passage for molten plastic is formed through the center of said hot probe whereby when said molten plastic is forced through said hot probe under high pressure it causes said hot probe to expand radially outwardly into firm engagement with both said stationary sprue bushing at its upper end and said rotary gate bushing at its lower end thereby effecting a seal to prevent leakage of said molten plastic.

18. A mold gate as defined in claim 17 where said hot probe is formed with a relatively thin upper end and a relatively thin lower end to facilitate radial expansion of said upper and lower ends when molten plastic is forced under high pressure through said hot probe, with the result that the higher the pressure of said molten plastic the greater the seal effected by the radial expansion of said upper and lower ends of said hot probe.

19. A mold where molten plastic is conducted to flow through a gate to a mold cavity for the injection molding of plastic parts, said mold having an adjustable gate for controlling the flow of said molten plastic to said mold cavity, said gate comprising, in combination, a radially outer gate member having a round, central opening at a lower end thereof through which said molten plastic flows to said mold cavity, a hot probe extending vertically within said radially outer mold gate member with a lowermost end portion of said hot probe located adjacent to said central opening, said portion having a cross-section approximately equal to a minimum diameter of said round, central opening, said hot probe being adjustable vertically between a raised, fully-open position, and a lowered, fully-closed position where a lower end of said portion of said hot probe extends through said central opening to close said gate, said hot probe being adjustable to intermediate vertical positions between said fully-open and fully-closed positions to partially open positions where said lowermost end portion of said hot probe cooperates with a portion of said radially outer mold gate member, which gate member portion surrounds said central opening, to define a ring-shaped passage through which said molten plastic can flow to said mold cavity, said ring-shaped passage having an open area which varies depending on said vertical position of said hot probe, and apparatus for adjusting said vertical position of said hot probe to vary said open area of said ring-shaped passage.

* * * * *